UNITED STATES PATENT OFFICE.

FREDERICK CHARLES FITZGERALD, OF LONDON, ENGLAND.

LITHOGRAPHIC-INK COMPOSITION.

1,406,837.   Specification of Letters Patent.   Patented Feb. 14, 1922.

No Drawing.   Application filed November 26, 1920. Serial No. 426,552.

*To all whom it may concern:*

Be it known that I, FREDERICK CHARLES FITZGERALD, a subject of the King of Great Britain and Ireland, residing at London, England, have invented certain new and useful Improvements in Lithographic-Ink Compositions, of which the following is a specification.

This invention relates to lithographic ink composition or an additive for ordinary lithographic ink, which will avoid the necessity for using water to damp the lithographic printing surface whether a stone, zinc, aluminum or like plate or cylinder.

The additive includes a suitable grease-resisting material such as glycerine, glycol, levulose or other polyhydric alcohol, and/or magnesium butyrate or like esters or any mixtures of these and like substances, and a suitable deliquescent material such as calcium chloride or sodium lactate, and the potassium phosphates or sodium magnesium chloride or any mixtures of these or like substances. It may also include other materials as hereinafter set forth.

The deliquescent materials are preferably mixed together before addition to the glycerine or like substance and then the mixture may be heated to facilitate solution. This solution or additive is thoroughly incorporated with the lithographic ink by grinding, or other suitable means, either with or without the aid of suitable solvents or mixtures of solvents such as benzene and alcohol or any mixtures of these and like substances.

A proportion of pigment sufficient to keep the colour strength of the mixture the same as that of the lithographic ink may be added to the mixture while it is being incorporated with the ink.

Lithographic ink as known in the art is usually made by the thorough admixture of high grade linseed oil varnish and pigment.

The additive may be added to the lithographic ink immediately before use, or if desired it may be thoroughly incorporated with the lithographic ink before it is sent to the user.

The following example has been found to give excellent results:—

|   | Parts by weight. |
|---|---|
| Glycerine | 40 to 60 |
| Calcium chloride | 5 to 10 |
| Potassium phosphate | 2 to 5 |
| Carbolic acid | 2 to 4 |
| Liquid gum | 4 to 10 |
| Lithographic ink | 140 to 180 |

If desired thin lithographic varnish may be added in sufficient quantity to thin the ink to the required degree for working.

By liquid gum is meant a solution of a gum such as gum arabic, tragacanth or other gum, in water, glycerine or other solvent.

Carbolic acid and liquid gum improve the properties of the ink and the quality of printing, the carbolic acid ensuring a sharper impression and the gum effecting a more regular distribution of the ink on the colour rollers.

The term potassium phosphate is meant to include any of the three potassium phosphates represented by the formulæ $K_3PO_4$, $K_2HPO_4$ and $KH_2PO_4$ and not merely the normal phosphate $K_3PO_4$.

The function of the glycerine is to prevent the greasy medium of the ordinary lithographic ink from adhering to the dry printing plate or stone, it being usual to moisten the stone with water on those parts which are to repel the ink. The present invention avoids the necessity for this moistening. If glycerine is used alone for this purpose, other difficulties occur with disastrous results. In other words, when glycerine has been added to the ink, the stone has still to be moistened. This is avoided in the present invention by the admixture among other ingredients of a grease-repelling material, which prevents the greasy medium of the ink from adhering to the dry printing plate or stone.

I claim:

1. An additive for lithographic ink comprising a grease resisting material and deliquescent material.

2. An additive for lithographic ink comprising a grease resisting material and deliquescent salt.

3. An additive for lithographic ink comprising a grease resisting material and calcium chloride.

4. An additive for lithographic ink comprising glycerine and deliquescent salt.

5. An additive for lithographic ink comprising glycerine, calcium chloride and the potassium phosphates.

6. An additive for lithographic ink comprising glycerine, deliquescent salt, carbolic acid and liquid gum.

7. An additive for lithographic ink comprising glycerine, calcium chloride, potassium phosphate, carbolic acid and liquid gum.

8. In combination lithographic ink and an additive comprising a grease resisting material and deliquescent salt.

9. In combination lithographic ink and additive comprising glycerine, calcium chloride, and potassium phosphate.

10. In combination lithographic ink and an additive comprising glycerine, calcium chloride, potassium phosphate, carbolic acid and liquid gum substantially as and for the purpose hereinbefore set forth.

11. In combination an additive comprising 40 to 60 parts by weight of glycerine and 5 to 10 parts of calcium chloride, and 140 to 180 parts of lithographic ink, said additive being thoroughly incorporated with said lithographic ink.

12. In combination, an additive comprising 40 to 60 parts by weight of glycerine, 5 to 10 parts of calcium chloride and 2 to 5 parts of potassium phosphate, and 140 to 180 parts of lithographic ink, said additive being thoroughly incorporated with said lithographic ink.

13. In combination, an additive comprising 40 to 60 parts by weight of glycerine, 5 to 10 parts of calcium chloride, 2 to 5 parts of potassium phosphate, 2 to 4 parts of carbolic acid, and 4 to 10 parts of liquid gum, and 140 to 180 parts of lithographic ink, said additive being thoroughly incorporated with said lithographic ink.

In testimony whereof I have signed my name to this specification.

FREDERICK CHARLES FITZGERALD.